United States Patent [19]

Jones

[11] 4,032,201

[45] June 28, 1977

[54] ROLLER BEARING ASSEMBLY

[75] Inventor: Allen Jacob Jones, Grants Pass, Oreg.

[73] Assignee: S. J. Agnew, Tenino, Wash.

[22] Filed: Dec. 10, 1975

[21] Appl. No.: 639,380

[52] U.S. Cl. .......................... 308/207 R; 308/204
[51] Int. Cl.² ........................................ F16C 13/00
[58] Field of Search ............... 308/1, 202, 6 R, 27, 308/28, 204, 215, 207 R; 214/660

[56] References Cited

UNITED STATES PATENTS

| | | | |
|---|---|---|---|
| 2,436,274 | 2/1948 | Watt | 308/207 R |
| 3,166,363 | 1/1965 | Kay | 308/207 R |
| 3,836,211 | 9/1974 | Schneeberger | 308/6 R |

Primary Examiner—Joseph F. Peters, Jr.
Assistant Examiner—Richard A. Bertsch

Attorney, Agent, or Firm—Kolisch, Hartwell, Dickinson & Stuart

[57] ABSTRACT

A roller bearing assembly for reducing friction between a relatively rotatable shaft member and support member wherein the support member has a circular hole formed therein through which a portion of the shaft extends. The bearing assembly includes an elongate length of roller chain having pivotally interconnected links with rollers rotatably mounted therein. The rollers are of a diameter smaller than the difference in radii between the shaft and opening. The link side plates at opposite sides of the rollers in the chain have a width greater than the roller diameters. The roller chain is shorter than the circumference of the shaft and may be secured adjacent one of its ends to the rotating member in the assembly.

9 Claims, 3 Drawing Figures

ROLLER BEARING ASSEMBLY

BACKGROUND AND SUMMARY OF THE INVENTION

This invention relates to a roller bearing assembly for reducing friction between a relatively rotatable shaft member and support member.

Various antifriction roller bearing assemblies have been developed in the past, and some of such assemblies have included pivotally interconnected links with rollers therein. Such previous devices however generally have been designed to form a complete connected circle about the shaft, or rotating element, and thus it has been necessary to have the roller chain very precisely sized to accommodate it to the rotating and support elements in the assembly. Further, such previous roller bearing assemblies using interconnected links generally have rollers of a greater diameter than the side-to-side dimension, or width, of the connecting link plates. The rollers thus are in contact both with the stationary and rotating members, whereby they may be forced in some instances to actually slide, or skid, along the surface of one of the members rather than providing a true rolling action.

A general object of the present invention is to provide a novel roller bearing assembly which overcomes the disadvantages of previous assemblies set out above in a simple and economic manner.

More specifically, an object of the invention is to provide a roller bearing assembly for a shaft and support member which includes an elongate roller chain having pivotally interconnected links with rollers thereon, wherein the length of roller chain is less than the circumference of the shaft and its opposite ends are unconnected to each other, whereby varying lengths of roller chain may be utilized to provide a roller bearing for the shaft without requiring that the chain be precisely dimensioned to closely encircle the shaft. This permits use of a wide variety of roller chains and effects economies in construction and design.

Another object of the invention is to provide a novel roller bearing assembly including roller chain having link plates on which the rollers are rotatably mounted, which link plates are wider, or have a greater side-to-side dimension, than the diameters of the rollers. This permits the edge margins of the link plates to rest in frictional contact with the rotating member so that the roller chain will rotate with the rotating member, while the edge margins of the link plates on the opposite side of the roller chain may be disposed in facing relationship with opposed faces of the support to maintain the roller chain in desired position, with the rollers thereon aligned with and contacting the bearing surface of the support member.

These and other objects and advantages will become more fully apparent as the following description is read in conjunction with the drawings.

DRAWINGS

DETAIL DESCRIPTION OF AN EMBODIMENT OF THE INVENTION

Figure 1:
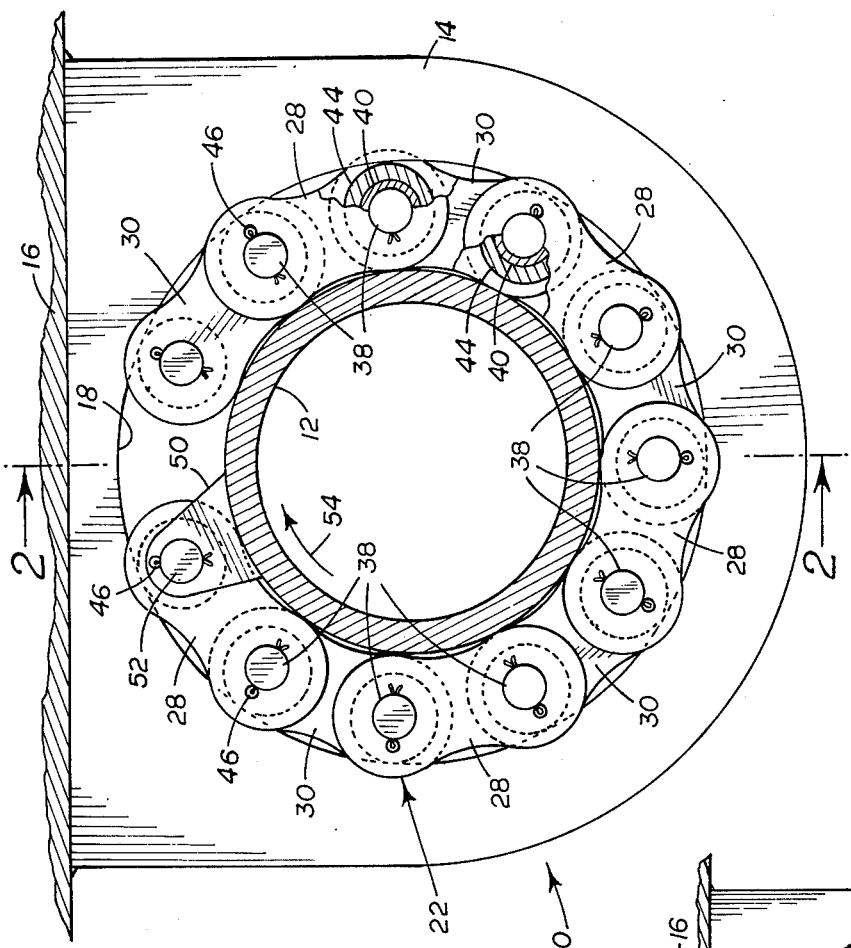
FIG. 1 is an end elevation view of a roller bearing assembly constructed according to an embodiment of the invention.

Referring first to FIG. 1, at 10 is indicated generally the roller bearing assembly of the invention. At 12 is indicated a portion of an elongate cylindrical shaft which, in the embodiment illustrated, is the rotatable member.

A support plate, or member, 14 is secured in a substantially stationary position as by welding to an overlying support 16. Support member 14 depends substantially vertically from support 16 and has a circular opening 18 extending therethrough. Opening 18 has a diameter larger than the diameter of shaft 12 and the shaft extends therethrough.

An elongate roller chain indicated generally at 22 is interposed between the periphery of shaft 12 and the radially inwardly facing surface of support plate 14 defining opening 18 to provide a reduced friction roller bearing between the shaft and support plate.

Describing roller chain 22 in greater detail it includes a plurality of pivotally interconnected links joined together to form an elongate chain having a length which is somewhat shorter than the circumference of shaft 12. The roller chain is of sufficient length to wrap about a major portion of the circumference of the shaft as is seen in FIG. 1.

Figure 2:
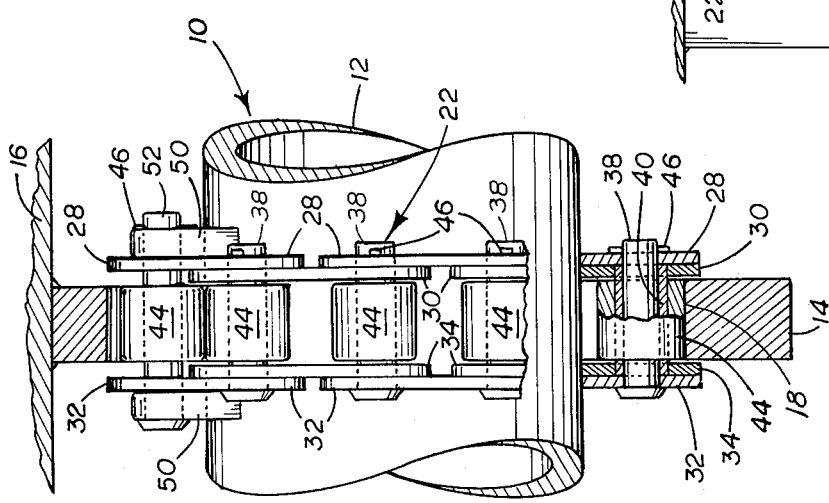
FIG. 2 is a cross-sectional view taken generally along the line 2—2 in FIG. 1.

The chain includes a plurality of pin link plates 28 and roller link plates 30 alternately spaced along the length of the chain along one side thereof as illustrated in FIGS. 1 and 2. At the opposite side of the chain and extending parallel to links 28, 30 are pin link plates 32 and roller link plates 34. Elongate pins 38 extend through accomodating aligned bores in the pin link plates and roller link plates to pivotally connect the same.

As is best seen in FIG. 2, a cylindrical bushing 40 is received on each of pins 38 and extends at its opposite ends through accommodating bores in roller link plates 30, 34.

A roller 44 is rotatably received on each of bushings 40 intermediate roller link plates 30, 34. Each of rollers 44 has a diameter which is smaller than the difference between the radius of opening 18 and the radius of shaft 12.

Pins 38 have enlarged heads at one set of their ends and bores for receiving cotter pins 46 adjacent their other end to hold them in the chain assembly.

As is illustrated the various link plates in the chain assembly have maximum widths at their end portions which is greater than the diameter of rollers 44 and somewhat greater than the space between the periphery of shaft 12 and the marginal edge portions of support plate 14 defining opening 18. The link plates also are spaced apart laterally a distance greater than the thickness of the marginal edge portions of plate 14 surrounding the opening. When the roller chain is in position as illustrated in FIGS. 1 and 2, the edge margins of the link plates projecting outwardly beyond one set of sides of rollers 44 are spaced to opposite sides of and in facing relationship with marginal edge portions of support plate 14 to maintain the roller chain in position, with rollers 44 riding on the radially inwardly facing surface of support plate 14. Opposite margins of the link plates extend radially inwardly beyond the opposite sides of rollers 44 rest against the periphery of shaft 12 and hold rollers 44 in positions spaced outwardly from the periphery of the shaft.

A pair of lugs 50 are secured, as by welding, to shaft 12 and project radially outwardly therefrom. A pin 52 extending through one end link of the roller chain connects the roller chain adjacent one of its ends to the shaft for rotation therewith. As is illustrated in FIG. 1, shaft 12 is intended to rotate in a clockwise direction, as indicated by arrow 54, and the roller chain link which would be the leading link in such rotation is the link which is attached to lugs 50. As is seen, opposite ends of chain 22 are unconnected.

In operation, when shaft 12 is rotated in a clockwise direction as illustrated in FIG. 1, roller chain 22 travels therewith, with rollers 44 rolling on the radially inwardly facing marginal edges of support plate 14. Since rollers 44 are held out of contact with shaft 14 the rolling action will occur only on the surface of plate 14 to provide free rolling action.

Figure 3:
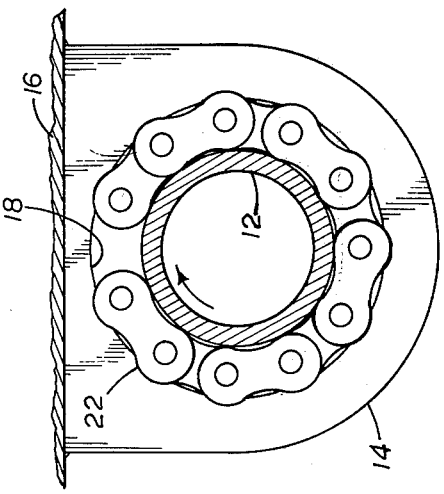
FIG. 3 is an end elevation view of a modified embodiment of the invention.

FIG. 3 illustrates operation of the apparatus without lugs 50. In operation of the device as illustrated in FIG. 3, the frictional contact between the periphery of shaft 12 and the radially inwardly facing edge margin portions of the link plates in the chain would be sufficient to cause the roller chain to rotate with the shaft within the support plate.

While a preferred embodiment of the invention has been described herein, it should be apparent to those skilled in the art that variations and modifications are possible without departing from the spirit of the invention.

It is claimed and desired to secure by letters patent:

1. A roller bearing assembly for reducing rotational friction between a relatively rotatable shaft member and a support member wherein one of said members is held substantially stationary, said assembly comprising means defining a circular opening in said support member for receiving said shaft, and an elongate roller chain including a plurality of pivotally interconnected links and a roller rotatably connected in each of said links, said roller chain being shorter than the circumference of said shaft member and being wrapped about said shaft member between said shaft member and the edge margins of said support member defining said opening, with opposite ends of said roller chain being unconnected to each other and the rollers in said chain engaging one of said members to provide rolling support between said members.

2. A roller bearing assembly for reducing rotational friction between a relatively rotatable shaft member and support member wherein one of said members is held substantially stationary, said assembly comprising means defining a circular opening in said support member receiving said shaft therein, and an elongate roller chain including a plurality of rollers, each roller having a diameter which is less than the difference in radii between said shaft member and said opening in the support member, and a plurality of pivotally interconnected links on which said rollers are journaled, said links having means thereon which extend outwardly beyond the periphery of a roller in said chain in the direction of said rotatable member to support the roller in a position spaced outwardly from the rotatable member, said roller chain being shorter than the circumference of said shaft member and being wrapped around said shaft member between said shaft and the edge margins of said support member defining said opening with the opposite ends of said roller chain being unconnected to each other and the rollers in said chain engaging said member which is substantially stationary, and means connecting said roller chain to said rotating member adjacent one end of said chain for rotation with said rotatable member.

3. The assembly of claim 2, wherein said roller chain has sufficient length to extend about a major portion of the periphery of said shaft member.

4. A roller bearing assembly for reducing rotational friction between a relatively rotatable shaft member and a support member wherein one of said members is held substantially stationary, said assembly comprising means defining a circular opening in said support member for receiving said shaft, and an elongate roller chain including a plurality of pivotally interconnected links and a roller rotatably connected in each of said links, said roller chain being shorter than the circumference of said shaft member and being wrapped about said shaft member between said shaft member and the edge margins of said support member defining said opening, with opposite ends of said roller chain being unconnected to each other and the rollers in said chain engaging one of said members to provide rolling support between said members, a roller having a diameter which is less than the difference in radii between said shaft member and said opening in the support member, and which further comprises means on said roller chain extending outwardly beyond the periphery of a roller in said chain in the direction of said rotatable member to support the roller in a position spaced outwardly from the surface of the rotatable member.

5. A roller bearing assembly for reducing rotational friction between a relatively rotatable shaft member and a support member wherein one of said members is held substantially stationary, said assembly comprising means defining a circular opening in said support member for receiving said shaft, and an elongate roller chain including a plurality of pivotally interconnected links and a roller rotatably connected in each of said links, said roller chain being shorter than the circumference of said shaft member and being wrapped about said shaft member between said shaft member and the edge margins of said support member defining said opening, with opposite ends of said roller chain being unconnected to each other and the rollers in said chain engaging one of said members to provide rolling support between said members, and wherein a link in said roller chain is wider than the diameter of its associated roller and extends beyond the periphery of its associated roller in the direction of the rotatable member to support the roller in a position spaced outwardly from the periphery of said rotatable member.

6. A roller bearing assembly for reducing rotational friction between a relatively rotatable shaft member and a substantially stationary support member, said assembly comprising means defining a circular opening in said support member for receiving said shaft, the marginal edge portions of said support member defining said opening having a substantially constant thickness measured in a direction extending axially of said shaft member, and an elongate roller chain including a plurality of pivotally interconnected links and a roller rotatably connected in each of said links, said roller chain being shorter than the circumference of said shaft member and being wrapped about said shaft member between said shaft member and the edge margins of said support member defining said opening, with opposite ends of said roller chain being unconnected to each other and the rollers in said chain engaging one of said members to provide rolling support between said members, said links in said roller chain including laterally spaced link plates supported at opposite ends of said rollers, with said link plates being spaced apart a distance greater than the thickness of the marginal edge portion of said support member and having edge margins which project outwardly in the direction of said support member beyond the periphery of said rollers, with a face portion of each link plate being disposed in facing relationship with a portion of said marginal edge portion to maintain said rollers aligned with the periphery of said opening.

7. The assembly of claim 6, wherein said link plates also have edge margins which project outwardly in the direction of said shaft beyond the periphery of said rollers to engage said shaft.

8. A roller bearing assembly for reducing rotational friction between a relatively rotatable shaft member and a support member wherein one of said members is held substantially stationary, said assembly comprising
means defining a circular opening in said support member for receiving said shaft,
an elongate roller chain including a plurality of pivotally interconnected links and a roller rotatably connected in each of said links, said roller chain being shorter than the circumference of said shaft member and being wrapped about said shaft member between said shaft member and the edge margins of said support member defining said opening, with opposite ends of said roller chain being unconnected to each other and the rollers in said chain engaging one of said members to provide rolling support between said members, and
means connecting said roller chain to said rotating member adjacent one end of said roller chain for rotation with said member.

9. A roller bearing assembly for reducing rotational friction between a relatively rotatable shaft member and a support member wherein one of said members is held substantially stationary, said assembly comprising
means defining a circular opening in said support member for receiving said shaft, and
an elongate roller chain including a plurality of pivotally interconnected links and a roller rotatably connected in each of said links, said roller chain being shorter than the circumference of said shaft member but of sufficient length to extend about a major portion of the periphery of said shaft member and being wrapped about said shaft member between said shaft member and the edge margins of said support member defining said opening, with opposite ends of said roller chain being unconnected to each other and the rollers in said chain engaging one of said members to provide rolling support between said members.

* * * * *